United States Patent [19]
Bednar

[11] Patent Number: 5,782,000
[45] Date of Patent: Jul. 21, 1998

[54] RECIPROCATING SAW WITH SPINDLE EXTENSION DEVICE

[75] Inventor: Thomas R. Bednar, Pewaukee, Wis.

[73] Assignee: Milwaukee Electric Tool Corp., Brookfield, Wis.

[21] Appl. No.: 937,043

[22] Filed: Sep. 24, 1997

Related U.S. Application Data

[63] Continuation of Ser. No. 643,870, May 7, 1996, abandoned.

[51] Int. Cl.[6] .................................................. B27B 11/02
[52] U.S. Cl. ........................ 30/393; 30/392; 30/394
[58] Field of Search ......................... 30/392, 393, 394, 30/272.1, 277.4; 83/586, 752

[56] References Cited

U.S. PATENT DOCUMENTS

| | | | |
|---|---|---|---|
| 1,554,096 | 9/1925 | Jensen | 30/394 |
| 2,087,018 | 7/1937 | Carter | 30/392 |
| 2,534,943 | 12/1950 | Bergeson | 83/752 |
| 2,601,877 | 7/1952 | Van Dam | 83/752 |
| 2,753,470 | 7/1956 | Armstrong | 30/277.4 |
| 2,881,519 | 4/1959 | Gardner | 30/394 |
| 3,192,972 | 7/1965 | Tenney | 30/392 |
| 3,945,120 | 3/1976 | Ritz | 30/393 |
| 4,385,443 | 5/1983 | O'Banion | 30/393 |
| 5,025,562 | 6/1991 | Palm | 30/392 |
| 5,050,307 | 9/1991 | Palm | 30/392 |
| 5,079,844 | 1/1992 | Palm | 30/392 |
| 5,392,519 | 2/1995 | Inoue et al. | 30/393 |
| 5,450,925 | 9/1995 | Smith et al. | 30/394 |
| 5,566,458 | 10/1996 | Bednar | 30/392 |

*Primary Examiner*—Hwei-Siu Payer
*Attorney, Agent, or Firm*—Michael, Best & Friedrich

[57] ABSTRACT

A reciprocating saw having a main body and a spindle mounted in the main body and movable between a retracted position and an extended position. The saw further includes a biasing member operatively associated with the spindle. The biasing member can include a spring that acts on an inner end of the spindle to bias the spindle toward either the extended position or the retracted position.

12 Claims, 2 Drawing Sheets

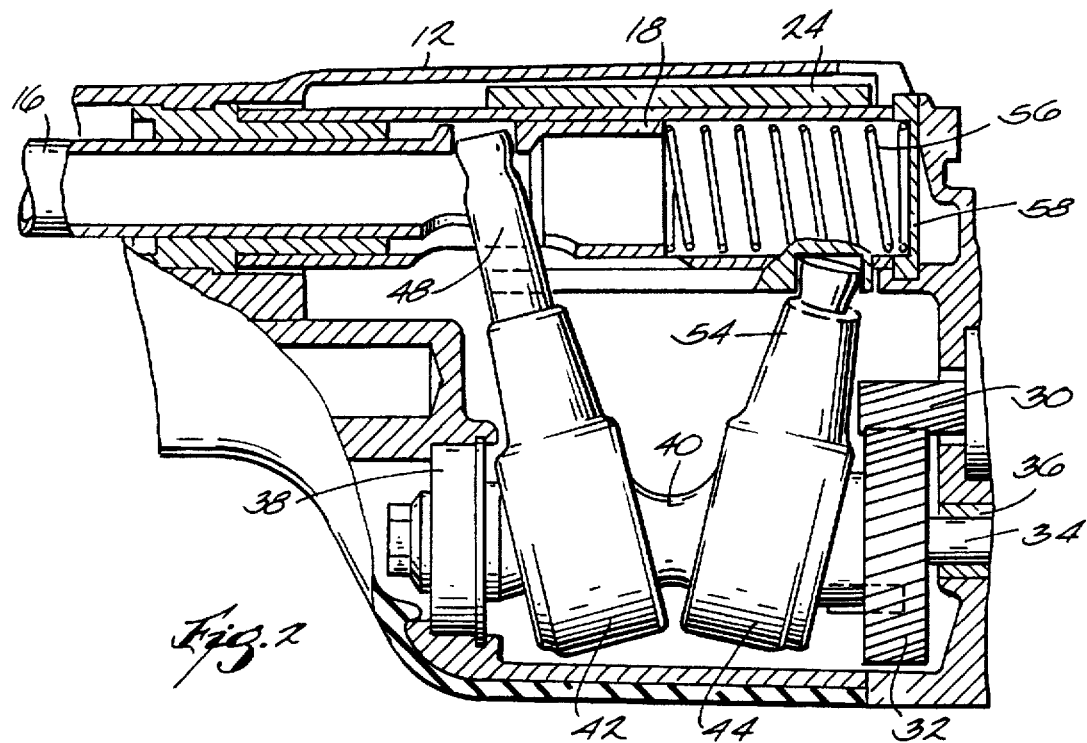
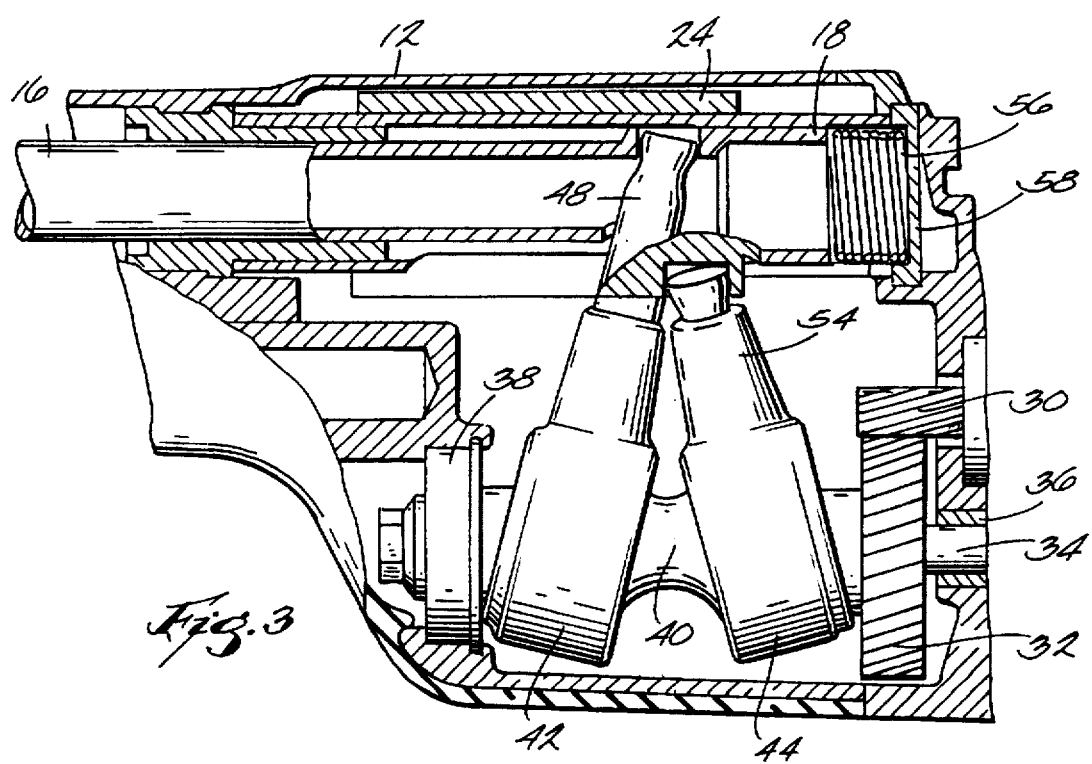

RECIPROCATING SAW WITH SPINDLE EXTENSION DEVICE

This is a Continuation of application Ser. No. 08/643,870, filed May 7, 1996, now abandoned.

FIELD OF THE INVENTION

The present invention generally relates to the field of power tools, and more specifically to the field of reciprocating saws.

BACKGROUND OF THE INVENTION

Reciprocating saws are used to cut a variety of objects, such as metal pipes, wood and drywall. Such saws typically include a housing, a spindle mounted in the housing for reciprocating motion, and an electric motor which provides power to the spindle through a mechanical reciprocating device that converts the rotary motion of a motor shaft to linear reciprocating motion. Such mechanical reciprocating devices can, for example, include an eccentric drive, as disclosed in U.S. Pat. No. 5,079,844, or a wobble plate drive, as disclosed in U.S. Pat. Nos. 5,025,562 and 5,050,307.

The spindles of reciprocating saws commonly include some means for securing a saw blade to the free end of the spindle. For example, such securing means can include a set screw or clamping device. In order to attach or detach a saw blade from the spindle, one must have access to the end of the spindle where the securing means is located. On some saws this is a problem since the securing means can retract completely into the housing of the saw when the spindle is in the fully retracted position. On such saws, if the saw comes to rest with the spindle in the fully retracted position, the spindle must be advanced, either manually or using the motor, until the end of the spindle is accessible.

SUMMARY OF THE INVENTION

The spindle can usually be manually moved from a retracted position by pulling on the spindle. However, this can be time consuming and strenuous. Further, with many mechanical reciprocating devices, when the spindle is in the fully retracted position, there is a dead spot where the spindle cannot be manually pulled out of the housing. In this situation, the motor must be "jogged" (i.e., intermittently actuated) until the spindle stops in a non-fully retracted position. Such jogging of the motor can be time consuming and further can be hard on the motor and other components in the saw.

The present invention alleviates the above-noted problem by providing a reciprocating saw wherein the spindle is encouraged to move toward an extended position, thereby decreasing the likelihood that the spindle will come to rest in a retracted position. With this design, the spindle is more likely to stop in a position where the free end of the spindle is exposed (i.e., not retracted in the housing), thereby allowing attachment or detachment of a saw blade.

In one aspect, the present invention provides a reciprocating saw having a main body and a spindle mounted in the main body and movable between a retracted position and an extended position. The saw further includes a reciprocating drive mechanism (e.g., wobble plates) for providing reciprocating motion to the spindle, and a power drive means (e.g., an electric motor) for providing power to the reciprocating drive mechanism. To achieve the benefits of the present invention, the saw further includes a means for moving the spindle toward the extended position (e.g., a biasing means) when the power drive means is in the deactivated state.

In one embodiment, the biasing means engages the inner end of the spindle, but could instead engage the spindle at any appropriate location. Preferably, the moving means includes a spring (e.g., a coil spring) operatively associated with the spindle, but could instead include any appropriate means for moving the spindle.

In another aspect, the present invention provides a reciprocating saw having a main body and a spindle mounted in the main body and movable between a retracted position and an extended position. To achieve the benefits of the present invention, the saw further includes a means for biasing the spindle toward the extended position. Preferably, the biasing means engages an inner end of the spindle, but could instead engage the spindle at any appropriate location. Further, the biasing means preferably includes a spring (e.g., a coil spring), but could instead include any appropriate device for biasing the spindle toward the extended position.

In another aspect, the present invention provides a reciprocating saw having a main body and a spindle mounted in the main body and movable between a retracted position and an extended position. To achieve the benefits of the present invention, the saw further includes an axially-acting biasing member (e.g., an outwardly-acting biasing member) operatively associated with the spindle. Preferably, the biasing member engages the inner end of the spindle, but could instead engage the spindle at any appropriate location. In one embodiment, the biasing member includes a spring (e.g., a coil spring) that provides a force to the spindle.

BRIEF DESCRIPTION OF THE DRAWINGS

FIG. 2 is an enlarged partial section view of the reciprocating saw illustrated in FIG. 1 with the spindle extended.

FIG. 3 is the enlarged partial section of FIG. 2 with the spindle retracted.

DETAILED DESCRIPTION

Figure 1:
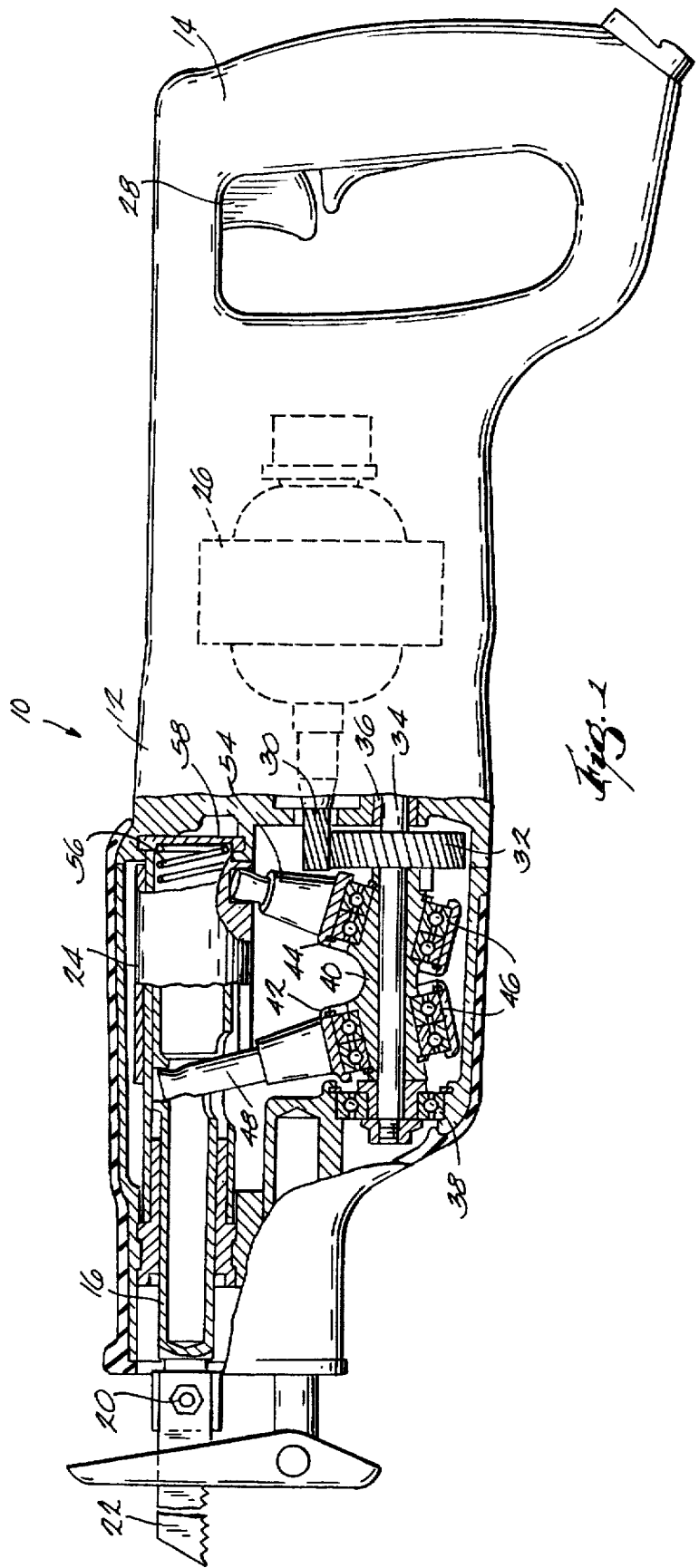
FIG. 1 is a side elevation view, in partial section, of a reciprocating saw embodying the present invention.

FIGS. 1–3 illustrate a reciprocating saw 10 embodying the features of the present invention. The reciprocating saw 10 generally includes a main body 12 having a handle portion 14. A spindle 16 is reciprocatably mounted within the main body 12, and includes an inner end 18 and an outer end 20 to which a saw blade 22 can be secured by appropriate means. The spindle 16 is movable between an inwardly-retracted position and an outwardly-extended position. A counterweight 24 is also reciprocatably mounted within the main body 12 to provide a vibration-reducing force that counteracts the forces created by movement of the spindle 16 and associated saw blade 22.

A power drive means in the form of an electric motor 26 is mounted in the main body 12, and an on-off switch 28 controls energization of the motor 26 between activated (e.g., powered) and deactivated (e.g., unpowered) states. The motor 26 includes a drive pin on 30 that engages a gear 32 mounted on a jackshaft 34. The jackshaft 34 is supported within the main body 12 by a needle bearing 36 on one end and a roller bearing 38 on the other end. A wobble shaft 40 is positioned over the jackshaft 34 and is designed to drive primary and secondary wobble plates 42,44 through corresponding bearings 46 operatively positioned between the wobble shaft 40 and the wobble plates 42,44. The primary wobble plate 42 includes a primary drive arm 48 that extends through a slot in the counterweight 24 and a slot in the spindle 16 to drivingly engage the reciprocating spindle 16.

The secondary wobble plate 44 includes a secondary drive arm 54 that drivingly engages the counterweight 24.

In accordance with the present invention, the reciprocating saw 10 further includes a means for moving the spindle 16 toward the extended position when the power drive means is in the deactivated state. For example, the moving means can include a biasing means for biasing the spindle 16 toward the extended position. In the illustrated embodiment, the biasing means comprises a biasing member in the form of a coil spring 56 positioned between the inner end 18 of the spindle 16 and a spring support 58 secured to the main body 12. The spring 56 is designed such that it applies to the spindle 16 an axially outward force that tends to move the spindle 16 toward the extended position.

It should be appreciated that, instead of a coil spring, the moving means could include any appropriate means for moving the spindle toward the extended position. For example, the moving means could include a cantilevered spring, leaf spring, fluid cylinder or any other appropriate device. Furthermore, the moving means need not act on the inner end of the spindle, and could instead act on some other portion of the spindle, such as a mid-portion of the spindle.

In operation, the spring 56 applies an outwardly-directed axial force on the inner end 18 of the spindle 16. In the illustrated embodiment, the biasing force is greatest when the spindle 16 is fully retracted due to the progressive force characteristics of coil springs. When power to the saw 10 is deactivated, the spindle 16 typically continues to move for a short period of time due to the momentum of the moving parts. If the spindle 16 comes to rest in a position other than the fully extended position, then the biasing force of the spring 56 will tend to move the spindle 16 toward the extended position. With the spindle 16 in a more-extended position, access to the outer end 20 of the spindle 16 is enhanced, thereby facilitating attaching or detaching a saw blade 22 on the spindle 16.

It should be appreciated that the moving means need not move the spindle to the fully extended position to fall within the scope of this invention, and instead could move the spindle toward but not completely to the extended position. Furthermore, the moving means need not move the spindle in all situations. For example, the moving means could be selectively activated or deactivated by the user.

In some reciprocating saws, the spindle must be in the freely retracted position in order to utilize an automatic blade release lever. Utilizing the concepts of the present invention, such a saw could be equipped with a means for retracting the spindle when the motor is deactivated. For example, an axially-acting biasing member in the form of a spring could be positioned to provide a biasing force to bias the spindle toward the retracted position. One way to do this is to replace the compression spring of the illustrated embodiment with a tension spring attached to the spindle on one end and to the housing on the other end.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A reciprocating power tool comprising:

a main body;

a spindle movably mounted in said main body, said spindle being movable from a retracted position to an extended position;

a wobble plate operatively associated with said spindle for driving said spindle toward said retracted position and toward said extended position;

a power drive means operatively associated with said wobble plate, said power drive means being changeable between activated and deactivated states; and a biasing member interconnected with said spindle for moving said spindle toward the extended position when said power drive means is in the deactivated state.

2. A reciprocating power tool as claimed in claim 1, wherein said spindle includes an outer end adapted to receive a saw blade and an inner end, and wherein said biasing member engages said inner end.

3. A reciprocating power tool as claimed in claim 1, wherein said biasing member includes a spring operatively associated with said spindle.

4. A reciprocating power tool as claimed in claim 3, wherein said spring includes a coil spring.

5. A reciprocating power tool as claimed in claim 3, wherein said spindle includes an outer end adapted to receive a saw blade and an inner end, and wherein said spring engages said inner end.

6. A reciprocating power tool comprising:

a main body;

a spindle movably mounted in said main body, said spindle being movable from a retracted position to an extended position;

a reciprocating drive mechanism fixed to said spindle to drive said spindle toward the extended position;

a power drive means operatively associated with said reciprocating drive mechanism, said power drive means being changeable between activated and deactivated states; and a means for moving said spindle toward the extended position when said power drive means is in the deactivated state.

7. A reciprocating power tool as claimed in claim 6, wherein said moving means includes a means for biasing said spindle toward the extended position.

8. A reciprocating power tool as claimed in claim 7, wherein said spindle includes an outer end adapted to receive a saw blade and an inner end, and wherein said biasing means engages said inner end.

9. A reciprocating power tool as claimed in claim 6, wherein said moving means includes a spring operatively associated with said spindle.

10. A reciprocating power tool as claimed in claim 9, wherein said spring is a coil spring.

11. A reciprocating power tool as claimed in claim 9, wherein said spindle includes an outer end adapted to receive a saw blade and an inner end, and wherein said spring engages said inner end.

12. A reciprocating power tool as claimed in claim 6, wherein said reciprocating drive mechanism includes a wobble plate.

* * * * *